United States Patent [19]

Gold

[11] Patent Number: 5,413,397
[45] Date of Patent: May 9, 1995

[54] AUTOMOTIVE WINDOW ASSEMBLY SYSTEM

[76] Inventor: Peter N. Gold, 465 N. Wood Rd., Rockville Centre, N.Y. 11570

[21] Appl. No.: 190,601

[22] Filed: Feb. 2, 1994

[51] Int. Cl.⁶ .............................................. B60J 1/00
[52] U.S. Cl. ............................... 296/146.15; 296/201; 52/204.62; 52/208; 52/DIG. 13; 156/108; 428/31
[58] Field of Search ................ 296/96.21, 146.15, 201; 49/463, 465; 52/204.53, 204.62, 204.591, 204.595, 204.597, 208, DIG. 13; 156/108; 428/31

[56] References Cited

U.S. PATENT DOCUMENTS

| | | | |
|---|---|---|---|
| 3,668,808 | 6/1972 | Perina | 52/204.597 X |
| 3,745,709 | 7/1973 | Perina | 49/465 |
| 4,271,566 | 6/1981 | Perina | 49/465 X |
| 4,987,699 | 1/1991 | Gold | 49/375 |

*Primary Examiner*—Dennis H. Pedder
*Attorney, Agent, or Firm*—Galgano & Burke

[57] ABSTRACT

A retention system for an automotive window assembly includes a window insertable onto a recessed generally L-shaped peripheral flange of a flanged window aperture formed in an automotive vehicle body, with the window being adhesively secured to the peripheral flange. The window assembly also has an interior window trim member for covering the interior side of the flange and an edge of the window and an exterior window trim for covering the exterior of the flanged window aperture and an edge of the window. The system further includes a hook and loop type fabric fasteners for securing the window to the flange, for securing the interior trim to the interior side of the flange and for securing the exterior trim member to the window and the exterior body panel. One of the hook and loop fabric fasteners is adhesively bonded to the said interior trim window, window edge and exterior trim and the other of the hook and loop fabric fasteners is adhesively bonded to the interior and exterior side of the L-shaped flange and at least one of the window edge and the exterior body panel. A curable adhesive is embedded in the hook and loop fabric fasteners which, upon curing, permanently joins the hook and loop fabric fasteners together.

5 Claims, 3 Drawing Sheets

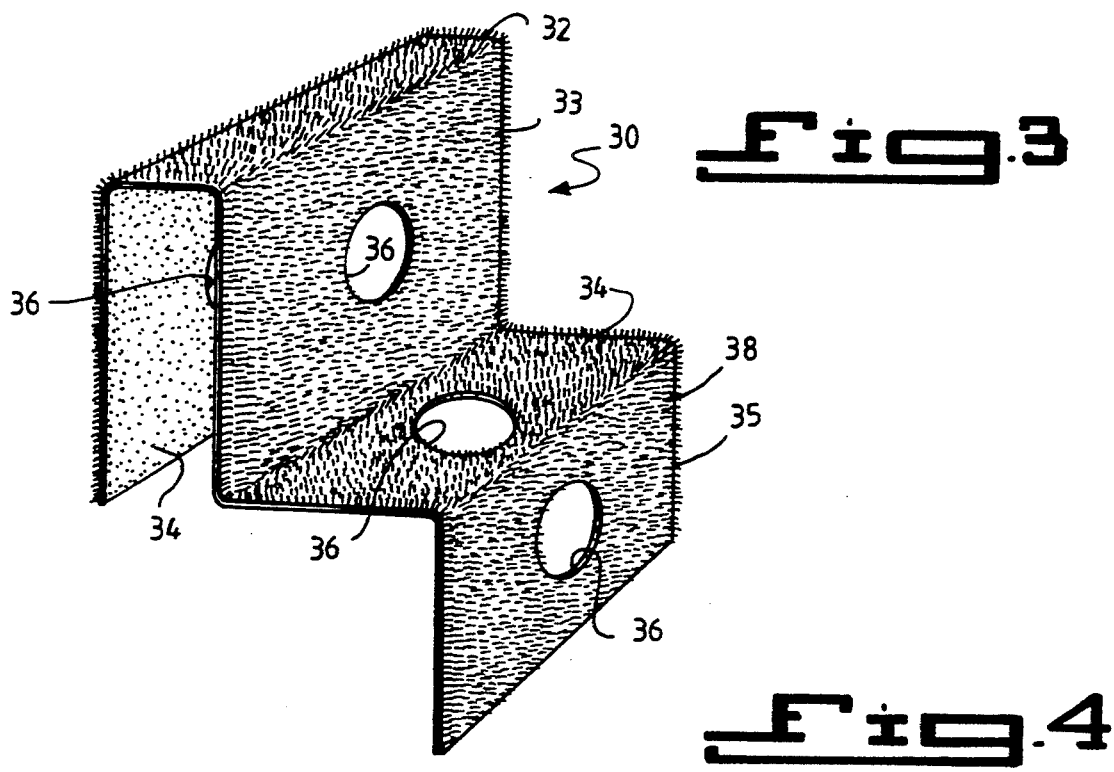
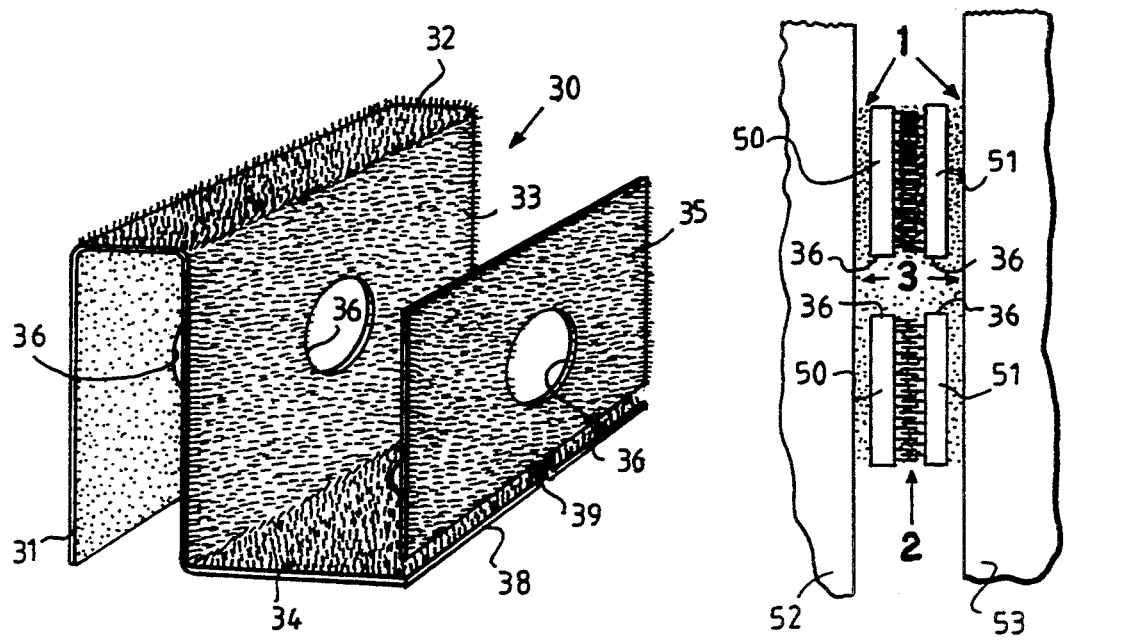

AUTOMOTIVE WINDOW ASSEMBLY SYSTEM

BACKGROUND OF THE INVENTION

1. Field of the Invention

This invention relates to an automotive window retention system for motor vehicle windows which are fixed (i.e., stationary) with respect to the vehicle body. Specifically, the invention relates to an automotive window retention system for mounting a window assembly onto a recessed generally L-shaped peripheral flange of a window aperture formed in an automotive vehicle body which employs both hook and loop fabric fasteners and a curable adhesive embedded therein to provide a very secure yet facile assembly of the window to the vehicle body.

2. Description of the Prior Art

Various automotive window retention systems are well known, one of which is represented in FIG. 1 of the drawings. As shown therein, a fixed automotive window opening normally consists of a metal interior body panel generally designated 10 welded to a metal exterior body panel generally designated 12, the latter of which has a peripherally recessed L-shaped flange, generally designated 14, peripherally extending about the desired automotive window opening. Flange 14 consists of a lower leg 15 perpendicular to the exterior body panel 12 and an upper leg 16 abutting an upper edge section 19 of the interior body panel 10 and disposed generally normally to the lower leg 15. Mounted on the lower leg 15 is one or more rubber or plastic spacers 17 and mounted on the upper leg 16 is one or more rubber or plastic semispherical spacers 18 which serve to properly position and space the glass window 20 in the recessed body panel opening defined by the L-shaped flange. A polyurethane adhesive is applied into the space between the upper leg 16 and the interior side of the window glass panel 20 which, upon curing, serves to permanently secure the window in the body panel opening.

An interior window trim 22 is secured to the interior side of the interior body panel via Velcro ®-type hook and loop fabric fastening elements 23, 24, one of which is secured to the interior trim 22 and the other of which is secured to the interior side of the upper edge section 19 of the interior body panel 10. An outer window trim 26 covers the outer edge of the window 20 and a portion of the exterior body panel 12 and is secured to the latter via a screw 27 extending through the exterior window trim 26 and the body panel 12 properly positioned by a spacer 28.

As can be appreciated from the above description, this prior art retention system requires numerous parts and assembly steps, as a result of which it is quite costly in terms of both actual material costs and in labor. Furthermore, so far as is known, no presently available window retention system is available which minimizes the mounting materials used, saves steps and time, and allows for an easy and facile mounting and retention of the window system in a manner comparable to that according to the present invention.

SUMMARY OF THE INVENTION

Accordingly, it is an object of the present invention to provide a novel system for mounting stationary motor vehicle window assemblies onto a flange within a window aperture formed in a motor vehicle body which is relatively simple in design, relatively inexpensive in material costs and labor, and easy and facile to use and assemble.

It is a further object of the present invention to provide an entirely new window assembly system including a spacing system, a setting stop system and a retention system for added outer and interior added window trim, which affords motor vehicle window assemblies both a mechanical and adhesive interlock system to provide a highly effective and permanent mounting of the window to the flanged window aperture.

It is a more particular object of the present invention to provide a combination device and adhesive joining system with multifunctional functions, with direct and spin off advantageous relationships, that have part of its design, back up systems to make the entire system "idiot proof" to apply, with fewer parts in comparison to the prior art, with greater utility values in the continuous endeavor of understanding that adhesives are less costly than nuts and bolts, if applied in new joining systems that work with adhesives.

Certain of the foregoing and related objects are readily attained according to the present invention by the provision of a retention system for an automotive window assembly of the type having a window insertable onto a recessed, generally L-shaped peripheral flange of a flanged window aperture formed in an automotive vehicle body, the window being adhesively secured to the peripheral flange. The window assembly also includes an interior window trim member for covering the interior side of the flange and an edge of the window and an exterior window trim for covering the exterior of the flanged window aperture and an edge of the window. The system employs hook and loop type fabric fastening means for securing the window to the flange, for securing the interior trim to the interior side of the flange and for securing the exterior trim member to the window and exterior body panel. One of the hook and loop fabric fastening means is adhesively bonded to the interior trim window edge and exterior trim and the other of said hook and loop fabric fastening means is joined to the interior and exterior side of the L-shaped flange and at least one of the window edge and the exterior body panel. Curable adhesive means is embedded in the hook and loop fabric fastening means which upon curing permanently joins the hook and loop fabric fastening means together.

Preferably, the hook and loop fabric fasteners having openings formed therein in which the curable adhesive is received so that, upon curing, it forms a mechanical interlock therewith. Most desirably, the curable adhesive is a polyurethane adhesive. Most advantageously, the "other" of the hook or loop fasteners is of a one-piece construction and has an end panel section secured thereto by a line of weakening and at least one web section to allow the same to be reversed and be rotated 180 degrees for positioning against the exterior edge of the window.

BRIEF DESCRIPTION OF THE DRAWINGS

These and other objects and features of the present invention will become apparent from the following description considered in connection with the accompanying drawings which discloses several embodiments of the present invention. It is to be understood that the drawings are to be used for the purpose of illustration only and not as a definition of the limits of the invention.

In the drawings, wherein similar reference numerals denote similar elements throughout the several views:

FIG. 3 is a perspective view of the hook fabric web employed in the present retention assembly;

FIG. 4 is a schematic cross sectional view showing the three main retention points provided by the present retention system; and FIG. 5 is a view of the hook fabric web shown in FIG. 3 but showing the lower panel thereof twisted and reversed 180 degrees to modify its point of application.

DETAILED DESCRIPTION OF THE PREFERRED EMBODIMENT

Figure 1:
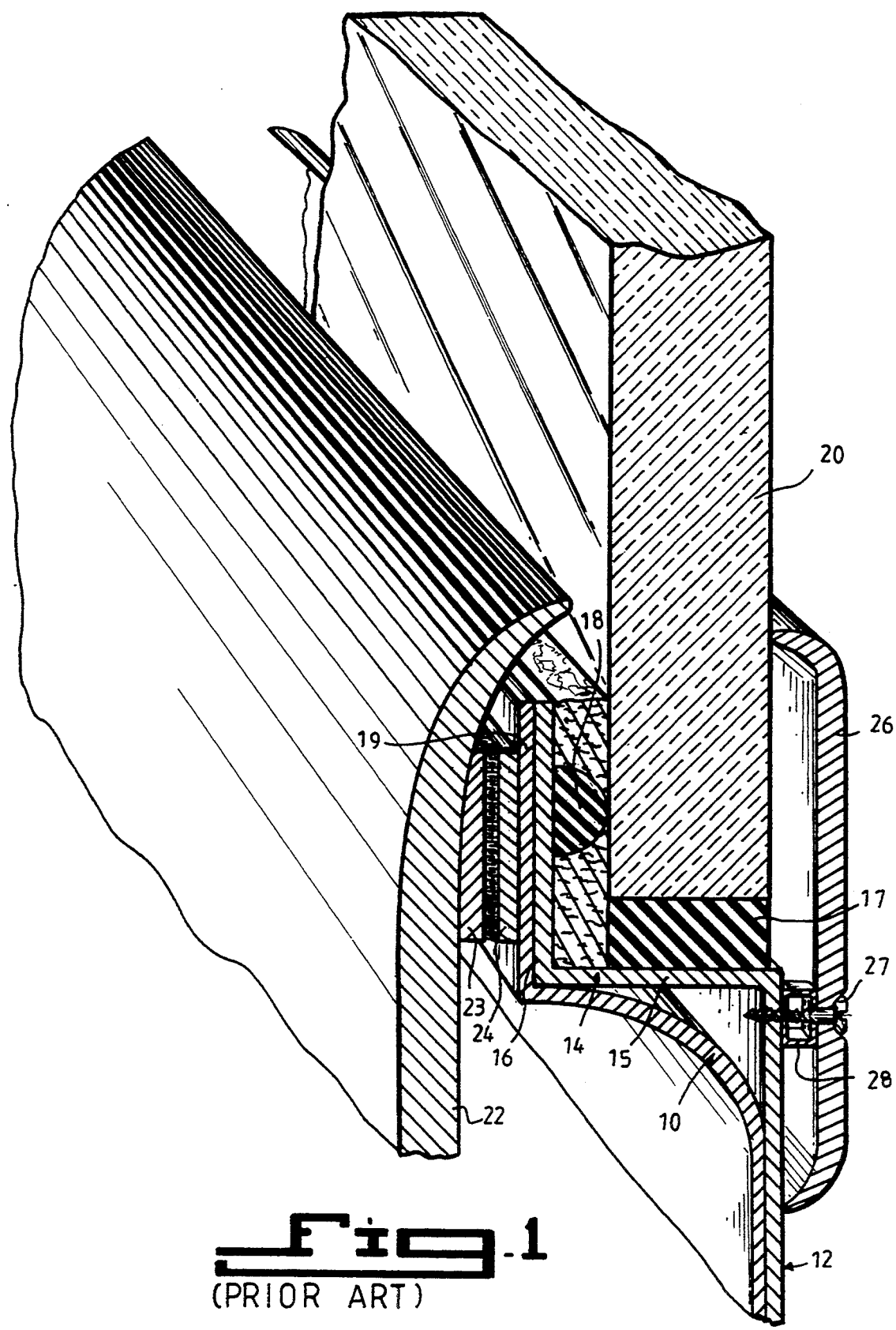
FIG. 1 is a side sectional view of the window retention system of the prior art.

Referring now in detail to the drawings, as previously discussed, FIG. 1 illustrates the prior art window retention system as heretobefore described. FIGS. 2-5 illustrate the inventive window retention system according to the present invention which specifically eliminates the need for the use of screw fasteners or spacers as shown in the prior art represented in FIG. 1.

Figure 2:
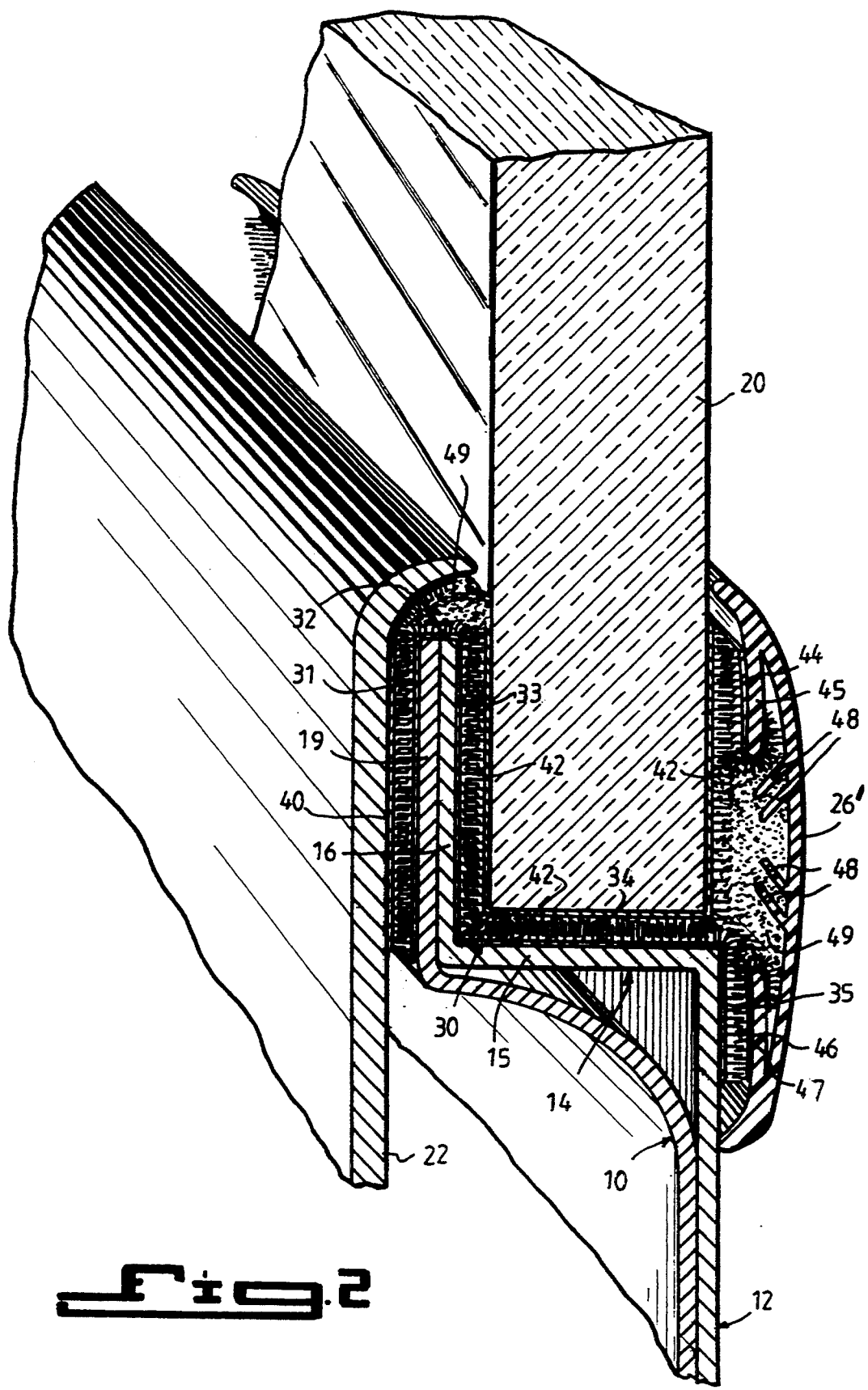
FIG. 2 is a side sectional view comparable to that of FIG. 1 but showing the window retention system of the present invention.

In particular, and as shown in FIGS. 2 and 3, a multi-folded, adhesive-backed web of Velcro ® hook fabric fastening members generally designated 30 is received over the interior body panel 10, the L-shaped recess peripheral flange 14 and a portion of the exterior body panel 12. Web 30 includes a generally upright first body panel 31 which is adhesively secured via its rear side to the upstanding section or leg 19 of the rear interior body panel 10, a second body panel 32 disposed normally thereto, which is adhesively secured to the top edge of the upstanding legs 19, 16 of the rear body panel 10 and of the L-shaped flange 14, a third upstanding body panel 33 adhesively joined to the exterior surface of the upper leg 16 of the L-shaped flange 14, a generally horizontally disposed fourth body panel 34 secured to the exterior of the lower leg 15 of the recessed L-shaped flange 14, and a generally upright, but downwardly depending fifth body panel 35 which is adhesively joined to the exterior body panel 12. Each of the body panels 31, 33, 34, 35 and 36 have one or more holes or apertures 36 formed therethrough, the purpose of which will be discussed in greater detail hereinafter.

To mate with the hook fabric body panels 31, 32, 33, 34, 35 of web 30, the corresponding Velcro ® loop fabric fastening elements are attached to the other window assembly parts opposite the hook fabric body panels where needed. In particular, an adhesive backed Velcro ® web 40 of loop-type fastening elements is secured to the interior window trim 22 to permit attachment of the latter to the interior surface of the upper leg 19 of interior body panel 10 via its mechanical interlock with hook body panel 31. Similarly, loop fabric web 42 is folded in the form of a U and attached via its adhesive backing to the peripheral lateral and bottom edges of the window glass 20. The window glass 20 is then positioned in the window aperture in its desired position, and it is pressed against hook-like fastening elements of body panels 33 and 34 to mechanically lock the same in place. The outside leg of the U-shaped web 42 is intended for mating with a hook-type Velcro ® web 44 applied to the interior side of exterior trim cap 26' along its top interior flange 45. Similarly, the interior lower portion of the exterior window cap 26' is attached to the lower body panel 35 via a loop web 46 adhesively attached to its bottom interior flange 47, thereby providing a mechanical interlock with hook fabric panel 35.

Prior to the mounting as described above, a conventional polyurethane adhesive 49 would be embedded in the hook and loop fasteners of the various Velcro ® webs so that, upon curing, the mechanical interlocking hook and loop fasteners would be permanently embedded within the adhesive and locked in place, thereby securely retaining the window within the aperture in the mounting position shown. As further shown, the exterior window cap has an upper and lower pair of angled flanges 48 which also would be embedded in the urethane adhesive to further facilitate interlocking of the exterior window trim 26' to the window 20 and exterior body panel 12.

As schematically represented in FIG. 4, this retention system provides three ways of locking the parts together. In the first part (arrow 1), the hook and loop fasteners 50, 51 are adhesively bonded to their respective window trim or body panel parts 52, 53 via an adhesive backing and together via their mechanical interlocking. In the second part (arrow 2), the adhesive is embedded within the mechanical hook and loop fasteners to provide a permanent retention of the fasteners together. Third, as shown by arrow 3, the holes 36 in the hook and loop fastener webs allows the adhesive to pass therethrough, thereby providing a mechanical interlock between the openings of opposing hook and loop web panels. This three-part adhesive and mechanical interlock system affords a retention redundancy which insures a very permanent and stable fixed mounting of the window to the flanged body panel opening while affording an extremely simple and labor-saving mounting technique.

Finally, FIG. 5 shows the web 30 of FIG. 3 but with the lower panel 36 reversed and rotated 180 degrees via its perforated line of weakening 38 such that it is only retained by a thin web 39. As a result of this orientation, a complete U-shaped loop web 42 would not be necessary for the window edge and, instead, an L-shaped piece (not shown) could be used for securing it to the L-shaped flange 14 via hook body panels 33, 34. In this embodiment, the lower body panel 36 would then be attached to the window edge for securing the same to the exterior window trim, as desired, for certain applications.

Various modifications of the present invention can be made as will be apparent to those skilled in the art. For example, the hook and loop fasteners of the various web panels can, of course, be reversed depending upon the desired application. In addition, the interior and exterior window trims can, of course, be modified to suit the particular application, as well. Other conventional, curable adhesives besides polyurethane could also be employed.

Accordingly, while only several embodiments of the present invention has been shown and described, it is to be understood that many changes and modifications may be made thereunto without departing from the spirit and scope of the invention as disclosed herein.

What is claimed is:

1. A retention system for an automotive window assembly of the type having a window insertable onto a recessed generally L-shaped peripheral flange of a flanged window aperture formed in an automotive vehicle body, said window to be adhesively secured to said peripheral flange, and the window assembly including an interior window trim member for covering the interior side of said flange and an edge of said window and an exterior window trim for covering the exterior of said flanged window aperture and an edge of the window, the improvement comprising:

adhesive-backed, paired hook and loop type fabric fastening means for securing said window to said flange, for securing said interior trim to said interior side of said flange and for securing said exterior trim member to said window and exterior body panel;

certain of said hook and loop fabric fastening means being adhesively bonded to said interior trim window, window edge and exterior trim and other of said hook and loop fabric fastening means being adhesively bonded to said interior and exterior side of said L-shaped flange and at least one of said window edge and an exterior body panel; and curable adhesive means for securing said window to said window flanged aperture in cooperation with said hook and loop fabric fastening means, said curable adhesive means being embedded in said hook and loop fabric fastening means and which, upon curing, permanently joins said hook and loop fabric fastening means together.

2. The retention system according to claim 1, wherein said hook and loop fabric fastening means having openings formed therethrough, filled with said curable adhesive means so that upon curing, said adhesive means forms a mechanical interlock with said fastening means.

3. The retention system according to claim 1, wherein said curable adhesive is a polyurethane adhesive.

4. The retention system according to claim 1, wherein said other of said hook and loop fastening means is of one-piece construction.

5. The retention system according to claim 4, wherein said other of said hook and loop fastening means has an end panel section secured thereto by a line of weakening and at least one web section to allow the same to be reversed and be rotated 180 degrees for positioning against the exterior edge of the window.

* * * * *